United States Patent Office 3,500,989
Patented Mar. 17, 1970

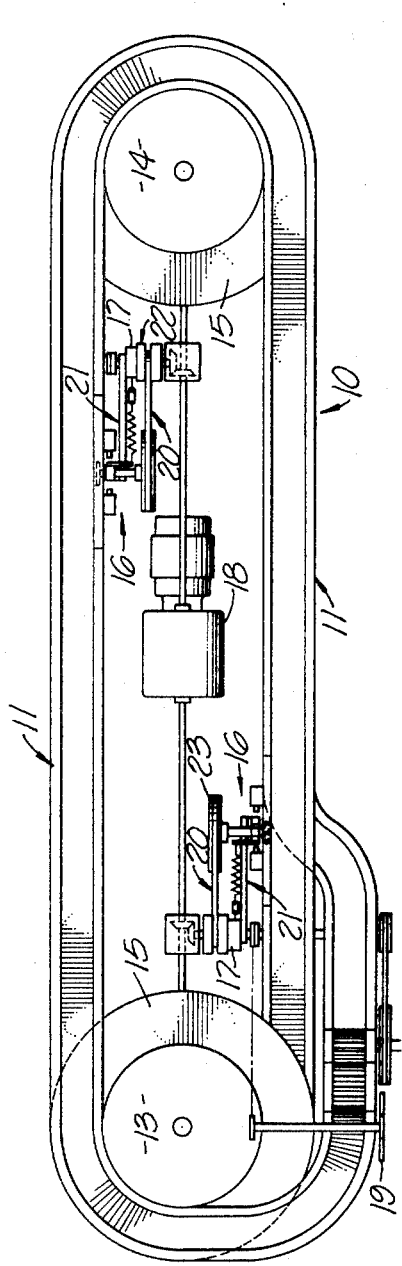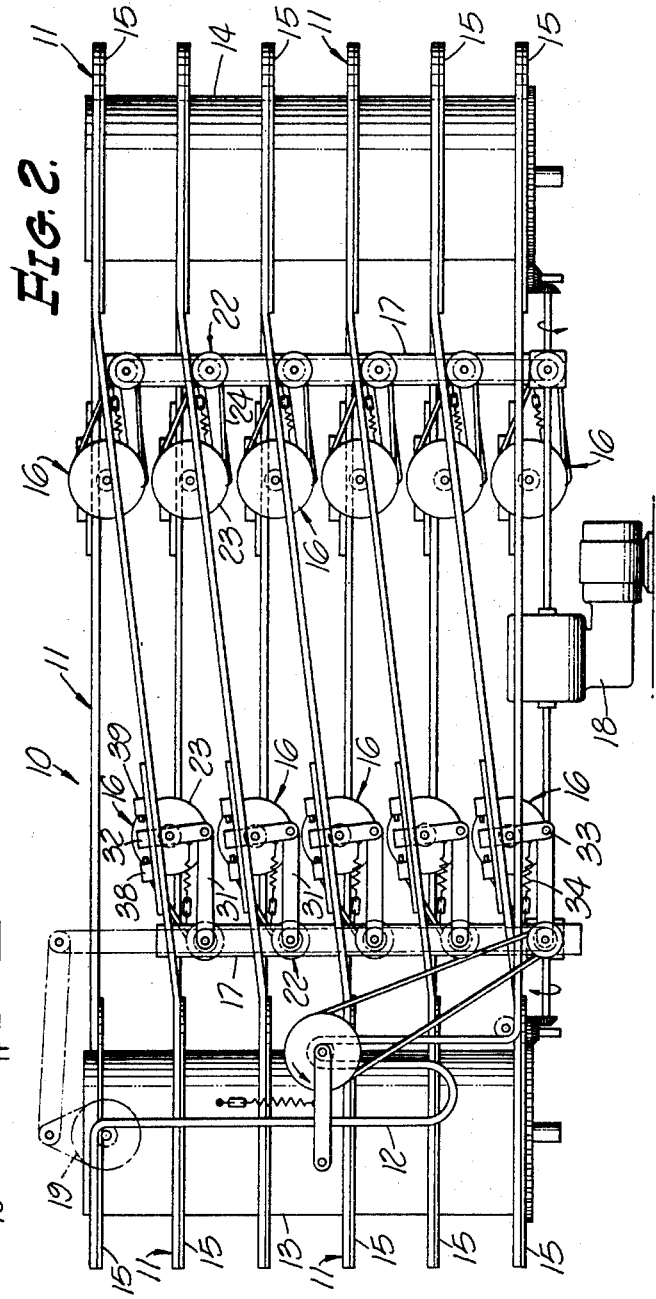

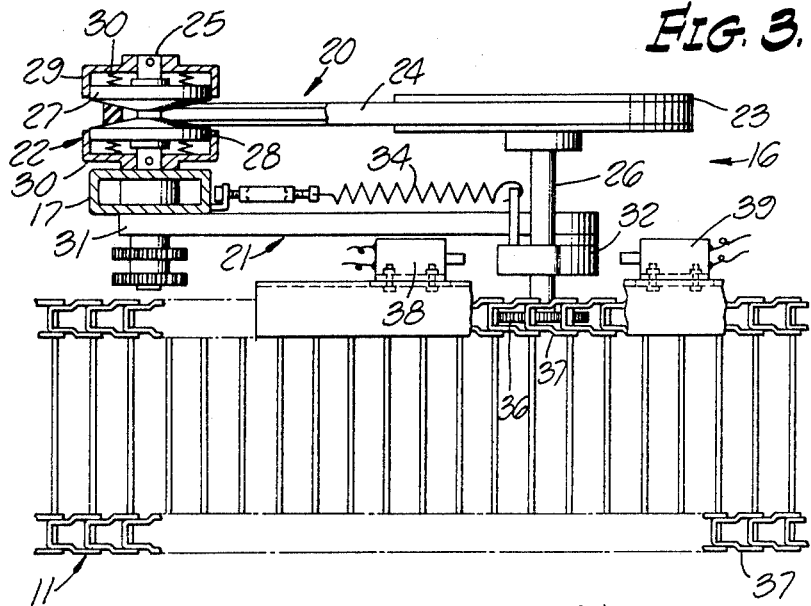
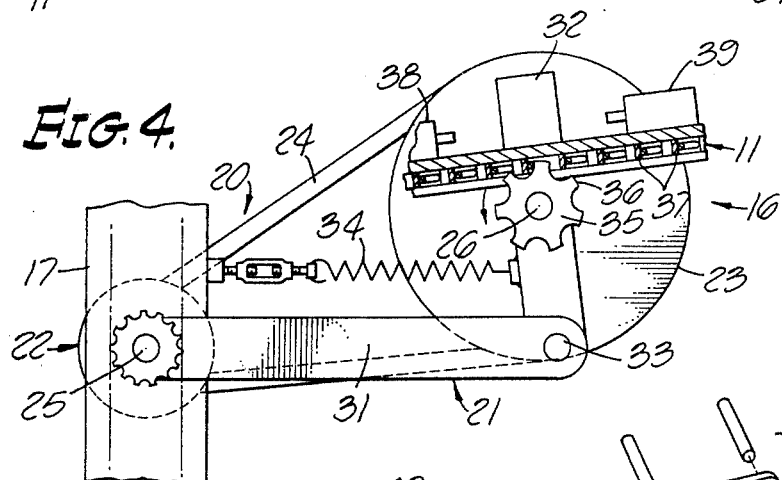
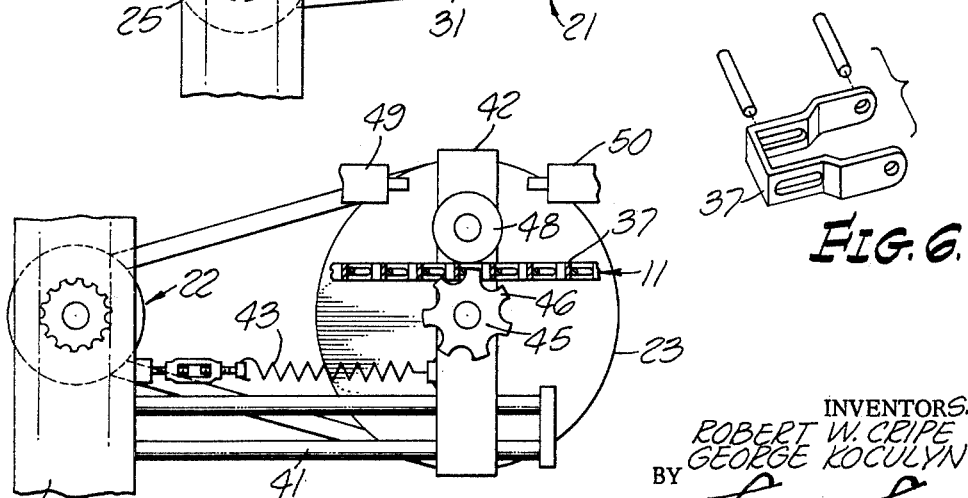

3,500,989
AUTOMATIC TENSION COMPENSATION FOR CHAIN BELT IN A CONVEYOR SYSTEM
Robert W. Cripe, 1537 Highland Ave., Glendale, Calif. 91202, and George Koculyn, 3239 Altura Ave., La Crescenta, Calif. 91214
Filed May 20, 1968, Ser. No. 730,313
Int. Cl. B65g *15/00, 17/00, 19/00*
U.S. Cl. 198—136                                                7 Claims

ABSTRACT OF THE DISCLOSURE

A conveyor system having multiple turns and using at least one variable speed drive device to provide uniform travel for a continuous flexible metal chain belt used in the system. The drive device responds automatically to the relative expansion of the chain belt to drive the chain belt at the speed necessary to compensate for excess slack and tension in the chain belt.

---

This invention relates to a conveyor system and is particularly directed to improvements in driving the continuous flexible metal chain belt used in the conveyor system.

A conveyor system of this type is particularly useful for cooling bakery products. Such a conveyor system normally requires several turns and therefore, a longitudinally flexible metal chain belt is desirable because it can turn right or left in combination with straight travel. Generally speaking, the chain belt used in the conveyor system is several hundred feet in length. Because of the multiple turns required and the length of the chain belt, a great deal of friction accumulates throughout the system. The friction forces are not constant nor are they uniform and the greater forces occur in that portion of the system where the turns are located.

The combination of the friction and the flexible characteristics of the metal chain belt causes the chain belt to expand longitudinally. The amount of expansion is dependent on the frictional force occurring at a given position.

Similar conveyor systems using a continuous flexible metal belt have been developed, but none have proved to be satisfactory. Most of the problems inherent in the past systems center around driving the belt. It is evident that in order to provide uniform travel of the belt, the drive speed must be varied in accordance with the relative expansion of the belt.

Unfortunately, the previous systems have not been able to properly control this drive speed variation. If the drive speed is increased too much, excess tension in the chain belt will cause the chain belt to break. If the drive is decreased too much, excess slack in the chain belt will cause the chain belt to become dislocated in the conveyor system.

Breaking or dislocation of the belt results in delay, while the chain belt is either replaced or relocated, and usually a complete loss of the products which were on the chain belt at the time of the breakage or dislocation.

In view of the disadvantages of the present conveyor systems, it is a particular object of this invention to provide a conveyor system using a continuous flexible metal chain belt which will not become inoperative because of excess tension or slack in the belt.

A further object of this invention is to provide a means to drive the chain belt which automatically responds to the varying expansion in the chain belt to provide the proper drive speed necessary for uniform travel of the belt.

Another object of this invention is to provide a conveyor system having safety features which will eliminate not only a loss in production but also injury to employees operating the conveyor system.

These and other objects will be apparent from the accompanying drawings and following description.

In the drawings:

FIGURE 1 is a top view of the conveyor system.

FIGURE 2 is a side view of the conveyor system showing the continuous flexible belt arranged in multiple horizontal runs.

FIGURE 3 is a top view of a variable speed drive device used in the conveyor system.

FIGURE 4 is a side view of a variable speed drive device used in the conveyor system.

FIGURE 5 is a side view showing a modification of a variable speed drive device used in the conveyor system.

FIGURE 6 is a diagrammatic view showing a segment of the flexible metal chain belt.

Referring to the drawings, the conveyor system, generally designated 10, includes a continuous and longitudinally flexible metal chain belt 11. The chain belt 11 is arranged in multiple horizontal runs with a supply loop 12 connecting the bottom run to the top run. The runs extend between a pair of cylindrical drums 13 and 14. These drums have horizontal shelves 15 which maintain the runs of the chain belt 11 in their horizontal position. The drums 13 and 14 may also be turned at a constant rate to aid in the travel of the chain belt and decrease friction in the system.

A variable speed drive device, generally designated 16, engages the chain belt 11 to drive the chain belt. Preferably, the drive device 16 engages the chain belt 11 before the chain belt 11 enters the turns around the drums 13 and 14. It is also preferable that a multiplicity of variable speed drive devices 16 be used in the system. It may be further desirable to locate a variable speed drive device 16 at the beginning of the supply loop 12 in order to prevent the chain belt in the supply loop from resting on the floor and becoming tangled.

The variable speed drive device 16 is supported by a support member 17 and is driven by a single main speed drive 18. This main speed drive 18 also drives a direct positive drive 19 located at the end of the supply loop 12 and further drives the drums 13 and 14 if desired.

The variable speed drive device 16 includes a variable speed transmission, generally designated 20, and an automatic adjusting means, generally designated 21.

The variable speed transmission 20 consists essentially of a pair of pulleys 22 and 23 connected by a V-belt 24. Pulleys 22 and 23 turn on pulley shafts 25 and 26, respectively. Pulley 22 includes a pair of beveled discs 27 and 28 mounted on and keyed to the shaft 25 so that the discs 27 and 28 and the shaft 25 turn together but the discs 27 and 28 are free to move axially along the shaft 25. The beveled walls of the discs 27 and 28 support the V-belt 24 and determine the effective radius of the pulley 22. The discs 27 and 28 are mounted within a pulley housing 29. Separating the discs 27 and 28 from the inner wall of the pulley housing 29 are springs 30. These springs 30 also force the discs 27 and 28 inwardly towards each other on the shaft 25 to increase the effective radius of the pulley 22. Shaft 25 is driven by the main speed drive 18 and is rotatably mounted within the support member 17 which maintains the pulley 22 in a fixed position.

The automatic adjusting means 21 includes a rigid horizontal arm 31 connected to and extending outwardly from the support member 17 and a vertical arm 32 pivotably mounted at 33 on the horizontal arm 31. An adjustable spring 34 connects the support member 17 and the vertical arm 32 to cause the vertical arm 32 to pivot inwardly towards the support member 17 and the pulley 2. The pulley shaft 26 is rotatably mounted within the vertical arm 32 and a sprocket 35 is connected to the shaft 26. The teeth 36 of the sprocket 35 engage segments 37 on one side of the flexible metal chain belt 11. Mounted on either side of the vertical arm 32 are micro-switches 38 and 39 which are operably engaged by the vertical arm 32 when the outward or inward movement of that arm exceeds a predetermined distance.

The modification of the automatic adjusting means as shown in FIGURE 5 includes a rigid horizontal arm 41 connected to and extending outwardly from the support member 17 and a vertical arm 42 slidably mounted on the horizontal arm 41. An adjustable spring 43 connects the support member 17 and the vertical arm 42 forcing the vertical arm 42 to slide inwardly on the horizontal arm 41 towards the support member 17 and the pulley 22. The shaft 26 is rotatably mounted within the vertical arm 42 and a sprocket 45 is connected to the shaft 26. The teeth 46 of the sprocket 45 engage the segments 37 and one side of the metal chain belt 11. A guide means 48 is also rotatably mounted on the vertical arm 42 and maintains the belt chain 11 in such a manner that the sprocket and chain belt will not become disengaged. Micro-switches 49 and 50 are mounted on either side of the vertical arm 42 and are operably engaged by the arm 42 when the movement of that arm exceeds a predetermined distance.

The operation of the apparatus is as follows:

The main speed drive 18 through a series of gears and power-transmission chains drives the direct positive drive 19, the drums 13 and 14, if desired, and the fixed pulley 2 of the variable speed drive devices 16 at a predetermined rate, the rate being dependent on the desired average travel speed of the chain belt 11.

The chain belt 11 is fed into the top horizontal run at the predetermined constant rate by the direct positive drive 19 from the supply loop 12. The chain belt 11 is advanced on a shelf 15 around the drum 13 towards the other drum 14. Prior to traveling around the drum 14, the chain belt is engaged and driven by a variable speed drive device 16. The rate that the drive device 16 drives the chain belt 11 is dependent on the distance the pulleys 2 and 23 of the drive device 16 happen to be separated at that time. After the belt advances around the drum 14, it moves on a slight incline downwardly to a lower shelf 15 on the drum 13 to begin the second. Before reaching the shelf, another variable speed drive device 16 engages the chain belt and drives it, again the rate being dependent on the separation between the pulleys 22 and 23. This procedure of driving the chain belt with a variable speed drive device 16 before travelling around a drum is repeated for each run until the chain belt finishes the bottom horizontal run. The chain belt 11 then enters the supply loop 12 to be advanced to the top horizontal run by the direct positive drive 19.

Throughout the conveyor system 10 the chain belt expands and, when the expansion decreases, contracts. As the chain belt 11 expands and tension is created in the belt 11, the force of the sprocket 35 engaging the belt will exceed the resisting force of the spring 34 and cause the vertical arm 32 to pivot outwardly and away from the support member 17 thereby increasing the distance between the pulleys 22 and 23. As the distance between the pulleys 22 and 23 increases, the V-belt 24 forces the discs 27 and 28 apart thereby decreasing the effective radius of the pulley 22. When the effective radius of the pulley 22 decreases, the rate of drive transmitted from the pulley 22 by the V-belt 24 to the pulley 23 and sprocket 35 decreases. As the drive speed decreases, the rate of travel of the belt 11 is decreased and tension is reduced.

As the drive speed continues to be reduced, expansion of the chain belt 11 decreases until slack begins to occur in the chain belt 11. At this point, the force of the spring 34 will exceed the force of the sprocket 35 engaging the belt 11 and cause the vertical arm 32 to pivot inwardly towards the support member 17 and reduce the distance between the pulleys 22 and 23. As this distance decreases, the tension in the V-belt 24 is reduced and the springs 30 force the discs 27 and 28 together to increase the effective radius of the pulley 22 which increases the rate of drive transmitted to the pulley 23 and sprocket 35. The rate continues to increase until tension begins to build up in the belt 11 whereby the vertical arm begins to move outwardly.

Each variable drive device 16 acts independently according to the relative expansion of the particular portion of the belt 11 it engages and drives.

Should the movement of the vertical arm 32 of any of the variable speed drive devices 16 exceed a predetermined distance in either direction, the vertical arm 32 will engage one of the micro-switches 38 or 39 to stop the entire conveyor system.

The variable speed drive device 16 using the modified automatic adjusting means operates in the same manner as above except that the movement between the pulleys 22 and 23 is controlled by a vertical arm 42 which slides on instead of pivoting about a rigid horizontal arm 41.

Because the flexible metal chain belt is driven by a variable speed drive which automatically responds to variations in expansion, a conveyor system is provided having multiple turns and horizontal runs which avoids malfunctioning because of excess slack or tension in the chain belt.

Having fully described our invention, it is to be understood that we am not to be limited to the details herein set forth, but that our invention is of the full scope of the appended claims.

We claim:

1. A conveyor system of the type used for cooling bakery products, having multiple turns and multiple horizontal runs and using a continuous longitudinally flexible metal chain belt, comprising:
   a supply loop located at the end of the bottom horizontal run and harboring a portion of the flexible metal chain belt before it passes from the bottom horizontal run to the top horizontal run;
   a constant direct drive means located at the end of said supply loop to pass the flexible metal chain belt from said supply loop to the top horizontal run;
   at least one variable speed drive means connected to drive the belt and located between the top horizontal run and said supply loop; and
   said variable speed drive means responding to lengthwise expansion of the flexible metal chain belt to drive the belt at varying speeds to compensate for slack and tension in the flexible chain belt within the system.

2. The combination as set forth in claim 1 wherein a single main drive drives said constant direct drive means and said variable speed drive means.

3. A variable speed drive device which responds to the relative longitudinal expansion of a flexible metal chain belt used in a conveyor system to automatically compensate for slack and tension in the chain belt, comprising:
   a variable speed transmission and an automatic adjusting means;
   means operably connecting said variable speed transmission and said automatic adjusting means whereby said variable speed transmission transmits drive to said automatic adjusting means and said adjusting means regulates said variable speed transmission;
   a support member supporting said variable speed transmission; and
   said automatic adjusting means engages and drives the chain belt whereby expansion in the chain belt serves to move said automatic adjusting means relative to said support member and whereby the movement of said automatic adjusting means decreases and increases the drive transmitted from said variable speed transmission.

4. The combination as set forth in claim 3, wherein said variable speed transmission includes first and second pulleys;
   a V-belt connecting said pulleys and transmitting drive from said first pulley to said second pulley; and
   said first pulley having an effective radius which varies according to the distance between said pulleys to decrease the speed of drive transmitted when said pulleys move apart and increase the speed of drive when said pulleys move together.

5. The combination as set forth in claim 3, wherein said automatic adjusting means includes a rigid horizontal arm connected to said support member and a vertical arm;
   one end of said vertical arm being connected to said horizontal arm;
   means allowing said vertical arm to move relative to said support member;
   a sprocket rotatably mounted on said vertical arm engaging and driving the flexible chain belt; and
   resilient means having one end connected to said support member and the other end connected to said vertical arm for moving said vertical arm towards said support member.

6. A variable speed drive device which responds to the relative longitudinal expansion of a flexible metal chain belt used in a conveyor system to automatically compensate for slack and tension in the chain belt, comprising;
   a variable speed transmission and an automatic adjusting means;
   said variable speed transmission including first and second pulleys;
   a support member supporting said first pulley;
   a V-belt connecting said pulleys and transmitting drive from said first pulley to said second pulley;
   said first pulley having an effective radius which varies according to the distance between said pulleys to decrease the speed of drive transmitted when said pulleys move apart and increase the speed of drive when said pulleys move together;
   said automatic adjusting means having a rigid horizontal arm connected to said support member and a vertical arm;
   one end of said vertical arm being connected to said horizontal arm;
   means allowing said vertical arm to move relative to said support member;
   a sprocket rotatably mounted on said vertical arm;
   resilient means having one end connected to said support member and the other end connected to said vertical arm for moving said vertical arm towards said support member;
   means establishing a drive connection between said sprocket and said second pulley; and
   said sprocket engaging and driving the flexible chain belt whereby expansion in the chain belt serves to move said sprocket away from said support member against the action of said resilient means, and whereby the movement of said sprocket increases the distance between said pulleys to decrease the speed of drive transmitted to said sprocket.

7. The combination as set forth in claim 6, wherein switch means operably engage said vertical arm when the movement of said vertical arm exceeds a predetermined distance in either direction whereby said switch means stops the chain belt.

References Cited

UNITED STATES PATENTS 2,057,173  10/1936  Waalkes _____ 198—203

EDWARD A. SROKA, Primary Examiner

U.S. Cl. X.R.

198—203